US007773739B2

(12) United States Patent
Kalidindi et al.

(10) Patent No.: US 7,773,739 B2
(45) Date of Patent: Aug. 10, 2010

(54) SELF-CONFIGURABLE TELEPHONY ARCHITECTURE

(75) Inventors: Rama Raju Kalidindi, Venkatapuram (IN); Kalpesh Savla, Cupertino, CA (US)

(73) Assignee: 3Com Corporation, Marlborough, MA (US)

( * ) Notice: Subject to any disclaimer, the term of this patent is extended or adjusted under 35 U.S.C. 154(b) by 1221 days.

(21) Appl. No.: 11/348,818

(22) Filed: Feb. 7, 2006

(65) Prior Publication Data

US 2007/0126266 A1    Jun. 7, 2007

(30) Foreign Application Priority Data

Dec. 7, 2005    (IN) .......................... 3295/DEL/2005

(51) Int. Cl.
*H04M 3/42* (2006.01)
(52) U.S. Cl. ........................... 379/201.02; 379/201.01; 379/201.03; 379/201.05; 379/201.08; 379/201.12
(58) Field of Classification Search ............ 379/201.02, 379/201.04, 88.03, 201.03, 201.05, 201.01, 379/201.12, 201.08; 345/738
See application file for complete search history.

(56) References Cited

U.S. PATENT DOCUMENTS

| | | | |
|---|---|---|---|
| 3,879,722 A | 4/1975 | Knowlton | |
| 4,928,306 A | 5/1990 | Biswas et al. | |
| 5,402,477 A * | 3/1995 | McMahan et al. | 379/201.04 |
| 5,790,652 A | 8/1998 | Gulley et al. | |
| 5,917,891 A * | 6/1999 | Will | 379/88.03 |
| 6,266,675 B1 | 7/2001 | Evans et al. | |
| 6,429,855 B2 | 8/2002 | Pabon et al. | |
| 6,542,475 B1 | 4/2003 | Bala et al. | |
| 2002/0122061 A1 | 9/2002 | Martin, Jr. et al. | |
| 2003/0080993 A1* | 5/2003 | Baker | 345/738 |
| 2004/0235520 A1 | 11/2004 | Cadiz et al. | |
| 2005/0039125 A1 | 2/2005 | Katano | |
| 2005/0118996 A1 | 6/2005 | Lee et al. | |
| 2005/0154798 A1 | 7/2005 | Nurmi | |

FOREIGN PATENT DOCUMENTS

WO    WO 01/84798 A2    11/2001

* cited by examiner

*Primary Examiner*—Thjuan K Addy
(74) *Attorney, Agent, or Firm*—Robert Plotkin, P.C.

(57) ABSTRACT

Techniques are disclosed for automating the process of configuring a telephone system. More specifically, the techniques disclosed herein enable a telephone system to monitor the behavior of users of that system and to configure the users' preferences based on their observed behavior. For example, the system may observe that a particular user frequently dials a particular telephone number manually. In response to this observation, the system may automatically configure the frequently-dialed telephone number as a speed dial number for that user. As a result, the user may dial the number in the future by pressing a speed dial button rather than by entering the number manually. Such an automatic configuration process may enable the telephone system to be adapted to its users' needs more quickly and accurately, and with less effort on behalf of the users, than is possible using conventional systems that require their users to perform configuration manually.

21 Claims, 5 Drawing Sheets

SELF-CONFIGURABLE TELEPHONY ARCHITECTURE

CROSS REFERENCE TO RELATED APPLICATIONS

This application claims priority under 35. U.S.C. §119 from co-pending and commonly-owned Indian Pat. App. Ser. No. 3295/DEL/2005, filed on Dec. 7, 2005, and entitled "Self-Configurable Telephony Architecture".

BACKGROUND

1. Field of the Invention

The present invention relates to configuration of communications systems and, more particularly, to configuration of telephone systems.

2. Related Art

Modern telephone systems provide a wealth of features far beyond those available in the networks of standalone rotary-dial telephones of yesterday. Even relatively simple and inexpensive telephones for use in homes provide the ability to store telephone numbers and then retrieve and dial them at the touch of a button ("speed dialing"), view previously-dialed telephone numbers and the telephone numbers of previously-received calls, and store telephone messages in multiple voice mailboxes. Businesses that use Private Branch Exchanges (PBXs) are able to provide their users with even more sophisticated features, such as the ability to participate in conference calls, forward messages to other users, and transfer incoming calls directly to voicemail or to an external telephone number (such as that associated with a cell phone).

As is the case with all sophisticated technological systems, such telephone systems require some initial configuration and are capable of being customized by their users. A particular user's telephone, for example, may need to be initially programmed with the user's name, a voicemail greeting, and the user's account privileges (such as whether the user is allowed to place international calls). The user may then perform further customization, such as storing individual telephone numbers for quick recall using the speed dial function and setting the system to transfer all incoming calls directly to voicemail.

Such initialization and customization processes can be tedious, time-consuming, and prone to error. To store a new telephone number as a speed dial number, for example, the user must first recognize that he calls a particular telephone number frequently, learn how to store such a number as a speed dial number, and then actually store the number in a free speed dial slot. Because the telephone numbers that a particular user dials frequently may change over time (such as when the user completes a project with a particular team and begins a project with a new team), this procedure may require the user to repeatedly identify new frequently-used telephone numbers and store them as speed dial numbers. The procedure for storing a speed dial number may involve performing a specific sequence of tasks that is difficult to remember and susceptible to being performed incorrectly, such as: (1) hitting a "speed dial" key; (2) entering the telephone number to store; (3) entering a number (e.g., 0-9) of an empty speed dial slot; and (4) hitting a key, such as the "#" key, to indicate that the procedure is complete. Such procedures can be particularly difficult for users to remember and perform correctly because they often vary from telephone system to telephone system. This is merely one example of the ways in which configuring conventional telephone systems can be tedious, time-consuming, and prone to error.

What is needed, therefore, are improved techniques for configuring telephony systems.

SUMMARY

Embodiments of the present invention are directed to techniques for automating the process of configuring a telephone system. More specifically, the techniques disclosed herein enable a telephone system to monitor the behavior of users of that system and to configure the users' preferences based on their observed behavior. For example, the system may observe that a particular user frequently dials a particular telephone number manually. In response to this observation, the system may automatically configure the frequently-dialed telephone number as a speed dial number for that user. As a result, the user may dial the number in the future by pressing a speed dial button rather than by entering the number manually. Such an automatic configuration process may enable the telephone system to be adapted to its users' needs more quickly and accurately, and with less effort on behalf of the users, than is possible using conventional systems that require their users to perform configuration manually.

In one aspect of the present invention, for example, a computer-implemented method is provided that: (A) receives telephone system data descriptive of past actions performed using the telephone system by a user of a telephone system; (B) identifies a preference of the user based on the received telephone system data; and (C) configures the identified preference.

In another aspect of the present invention, for example, a computer-implemented method is provided that: (A) identifies a plurality of frequencies of use of a plurality of features of a telephone system by a user of the telephone system, the plurality of features having a current mapping to a plurality of input selection means of a telecommunications device of the user of the telephone system; (B) identifies, based on the plurality of frequencies of use, a new mapping of the plurality of features to the plurality of input selection means; and (C) remaps the plurality of features to the plurality of input selection means using the new mapping.

Other features and advantages of various aspects and embodiments of the present invention will become apparent from the following description and from the claims.

DETAILED DESCRIPTION

Embodiments of the present invention are directed to techniques for automating the process of configuring a telephone system. More specifically, the techniques disclosed herein enable a telephone system to monitor the behavior of users of that system and to configure the users' preferences based on their observed behavior. For example, the system may observe that a particular user frequently dials a particular telephone number manually. In response to this observation, the system may automatically configure the frequently-dialed telephone number as a speed dial number for that user. As a result, the user may dial the number in the future by pressing a speed dial button rather than by entering the number manually. Such an automatic configuration process may enable the telephone system to be adapted to its users' needs more quickly and accurately, and with less effort on behalf of the users, than is possible using conventional systems that require their users to perform configuration manually.

Such a self-configurable telephone system may take advantage of data already available within the system. Modern PBX systems, for example, typically monitor and store data related to users of the system, such as information identifying the users (e.g., their names, addresses, and telephone numbers) and information descriptive of the telephone calls placed and received by such users (such as the telephone numbers of the caller and callee of a particular call). According to embodiments of the present invention, such existing data may be analyzed to identify preferences to configure for particular users. In addition to performing configuration based on analysis of existing data, the system may generate and store, additional data for the specific purpose of identifying user preferences to configure.

Figure 1:
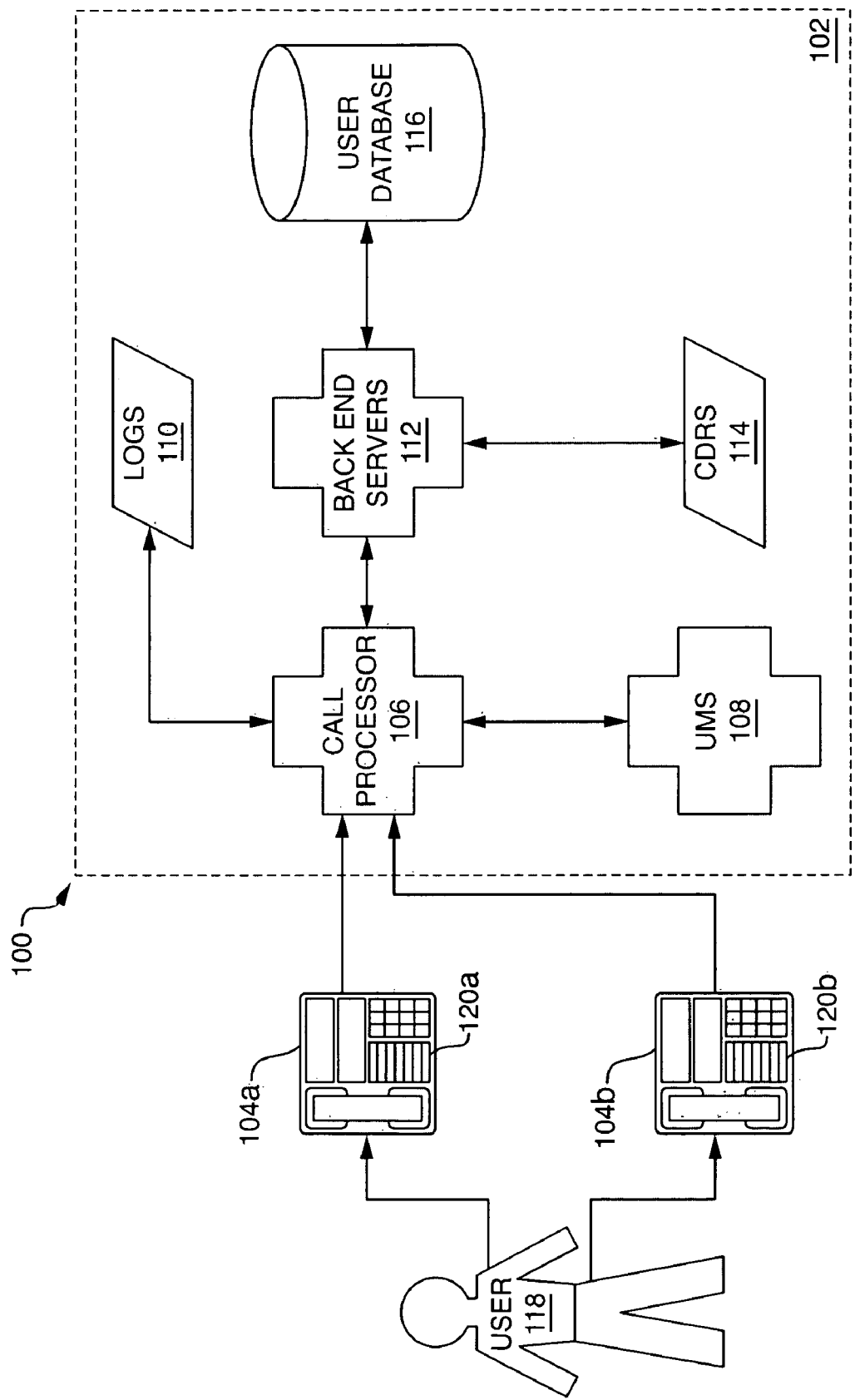
FIG. 1 is a block diagram of a prior art telephone system.

Consider, for example, the prior art telephone system 100 shown in FIG. 1. For purposes of simplicity, only a single node 102 of the system 100 is shown in FIG. 1. It should be appreciated, however, that the telephone system 100 may include many interconnected nodes. Furthermore, the system 100 illustrated in FIG. 1 uses terminology associated with 3Com® VCX™ (Voice Core exchange) technology for purposes of example. The 3Com® VCX™ technology is one example of IP-PBX technology. Embodiments of the present invention, however, are not limited to use in conjunction with 3Com® VCX™ technology, IP-PBX technology, or any particular kind of telephone system.

For purposes of example, a single user 118 of the system 100, having access to two telephones 104a-b, is shown. PBX systems, such as those implementing 3Com® VCX™ technology, often enable or require each user of the system to place telephone calls from any telephone in the system using that user's individual preferences. The term "user preferences" is used broadly herein to refer to any data associated with a particular user of a telephone system. Examples of user preferences include the user's telephone number, name, voicemail greeting, and speed dial numbers. Further examples of user preferences will be described below. The node 102 includes a user and directory database 116 that includes preferences such as contact information for each user (e.g., name, telephone number, and IP address). Preferences may also be stored elsewhere in the system 100, as will be described in more detail below.

When the user 118 accesses the telephone 104a, the system 100 may first attempt to determine which user's preferences to apply to operations performed using the telephone 104a. The system 100 may, for example, identify the preferences of the phone's default user (e.g., the user who works at the desk at which the telephone 104a is located). Alternatively, for example, the system 100 may require the user 118 to identify himself, such as by entering a personal identification number (PIN) or other unique identifier, to the telephone 104a.

The node 102 includes a call processor 106 that provides a front end interface between the user 118 and the remaining components of the node 102. When, for example, the user 118 enters a PIN to authenticate himself, the call processor 106 receives the PIN and passes it to back end servers 112 within the node 102. One function performed by the back end servers 112 is to act as an interface between the user database 116 and the remaining components of the node 102. When, for example, the call processor 106 provides a PIN to the back end servers 112, the back end server 112 access the data in the database 116 to identify the user associated with the PIN and perform any other necessary authentication. The back end servers 112 then notify the call processor 106 whether the authentication has succeeded and, if it has, the back end servers 112 provide the appropriate user's preferences from the user database 116 to the call processor 106, which in turn applies the preferences to operations performed by the user 118 on the telephone. If, for example, the retrieved preferences indicate that the user 118 is not allowed to place international calls, the call processor 106 disables international calling on the telephone 104a.

This is merely one example of a way in which the example architecture illustrated in FIG. 1 is a "data-driven" architecture. This means that the call processor 106 is driven by data stored in the user and directory database 116 and elsewhere in the system 100. The data that drive the call processor 106 include user preferences such as user authentication/authorization data, data descriptive of features and/or functions available to the users of the system 100, user device data (e.g., capabilities of the telephones 104a-b), and routing data. The call processor 106 communicates with the back end servers 112 at run time to derive the user's preferences 118 to manage the telephones 104a-b appropriately.

As a result of the data-driven nature of the system 100, much of the behavior of the call processor 106 may be changed merely by changing the data upon which the call processor 106 relies, and without changing the call processor 106 itself. The call processor 106 typically contains software that controls its behavior; in practice this means that the behavior of the call processor 106 may be modified without reprogramming its software.

Once the user's preferences have been identified, the user 118 may place a telephone call using the telephones 104a-b. In the simplest case, the user 118 uses one of the telephones 104a-b to manually dial a telephone number of another user of the system 100. In response, the call processor 106 (using data provided from the user database 116 by the back end servers 112) maps the dialed number to the physical telephone associated with the dialed number and performs functions such as verifying that the dialed telephone is not busy. Once a connection is established between the two users, the system 100 maintains the connection as long as the users require it, e.g., by channeling voice signals between the users.

The system 100 also generates and records information related to the telephone call for accounting and other record-keeping purposes. For example, the call processor 106: (1) generates a log of the call and stores the log in a set of logs 110; and (2) transmits information about the call to the back-end servers 112, which generate a call detail record (CDR) for the call that is stored in a set of CDRs 114. The stored logs 110 and CDRs 114 represent a record of calls placed through the node 102 and thereby provide an overall picture of the usage of the node 102 over time.

As will now be described in more detail, embodiments of the present invention enable the node 102 to learn from the usage patterns of the user 118 and thereby to configure the node 102 so that it is customized to fit such usage patterns. This self-configuration process frees the user 118 from the need to manually configure the node 102 to suit his needs.

Figure 2:
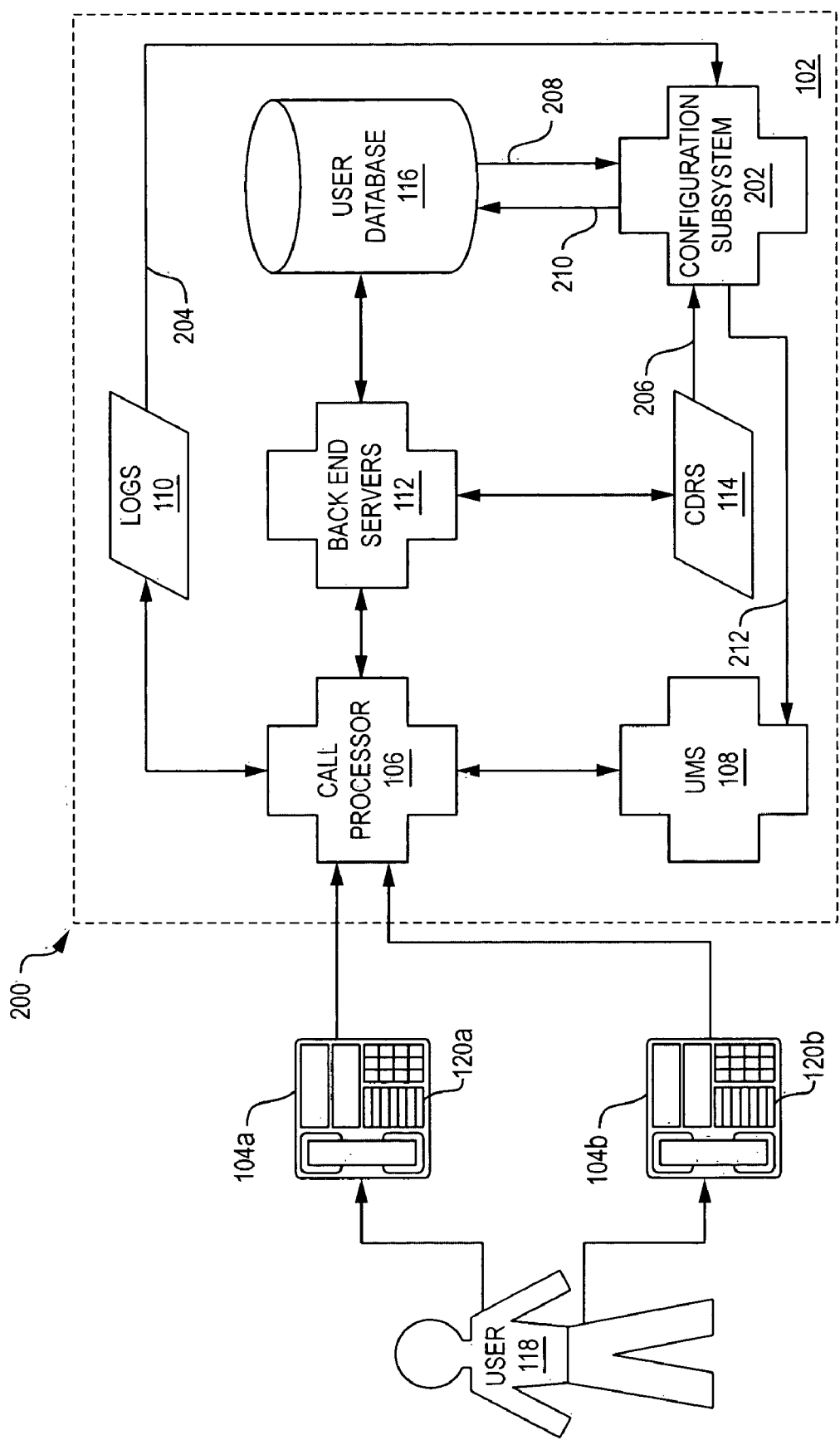
FIG. 2 is a block diagram of a self-configurable telephone system according to one embodiment of the present invention.

Referring to FIG. 2, a system 200 is shown according to one embodiment of the present invention. The node 102 shown in FIG. 2 is similar to that shown in FIG. 1. The node 102 in FIG. 2, however, includes a configuration subsystem 202.

Figure 3:
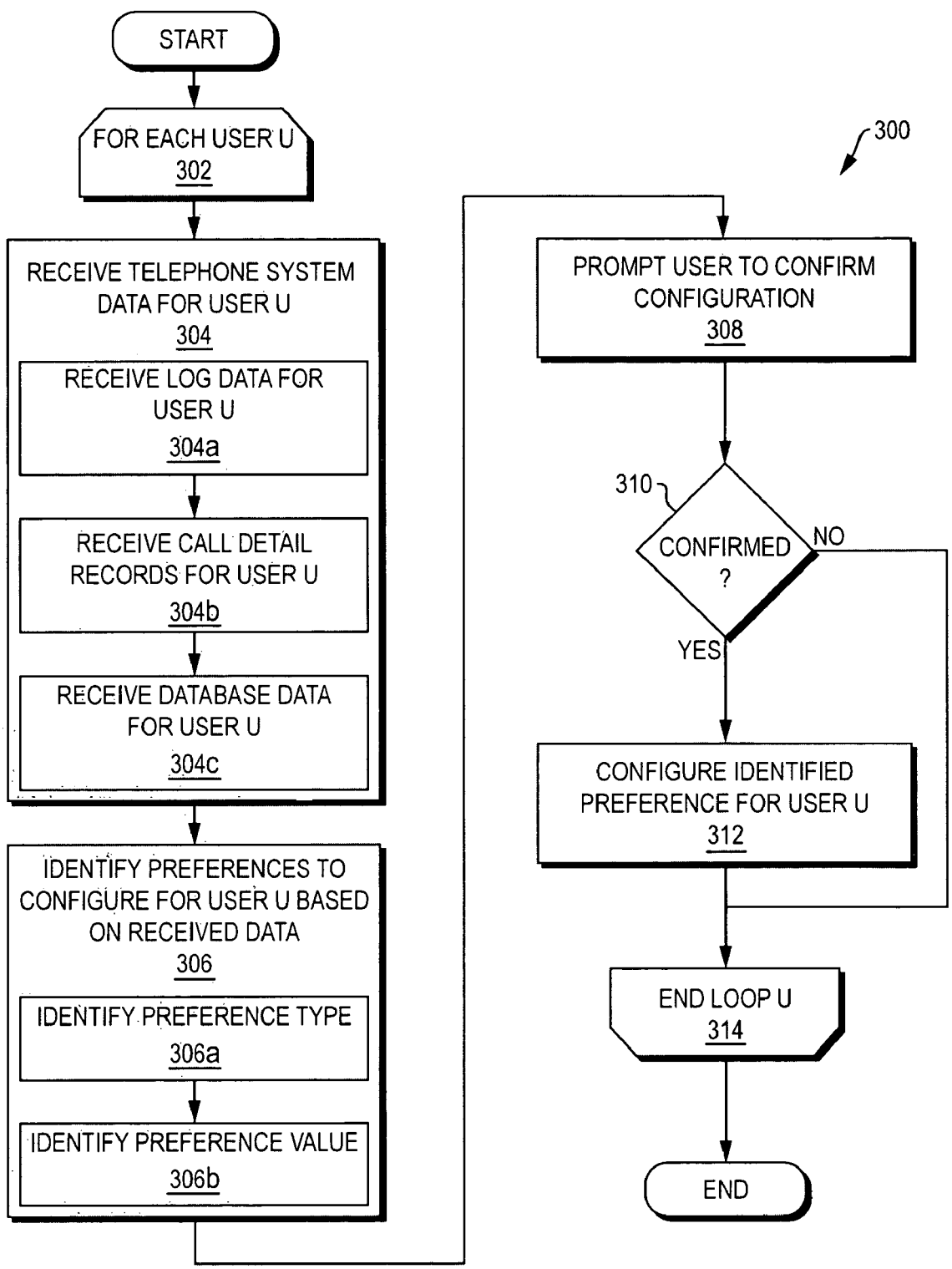
FIG. 3 is a flowchart of a method for automatically configuring user preferences in the system of FIG. 2 according to one embodiment of the present invention.

In general, the configuration subsystem 202 operates according to a method 300 illustrated by the flowchart shown in FIG. 3. The method 300 enters a loop over each user U of the node 102 (step 302). In other words, the method 300 performs the following steps for each user of the node 102. Alternatively, the configuration subsystem 202 may be configurable to perform the method 300 only for a subset of users, such as a particular subset specified by the system administrator. As yet another alternative, individual users may be given the ability to specify whether they want the configuration subsystem 202 to automatically configure preferences for them.

The configuration subsystem 202 retrieves telephone system data related to the user U (step 304). The term "telephone system data related to the user" refers generally herein to any data stored and/or transmitted in the system 100 that relates to the user 118. For example, the configuration subsystem 202 may receive telephone system data including, but not limited to, data 204 stored in the logs 110 (step 304a), data 206 stored in the call detail records 114 (step 304b), and data 208 stored in the database 116 (step 304c). Data 208 stored in the database 116 may include, for example, data identifying the models of the telephones 104a-b and data related to whether the current user 118 is a valid user. Note, however, that these are merely examples of telephone system data, and that the configuration subsystem 202 may make use of additional telephone system data or any combination of telephone system data.

Based on the telephone system data received, the configuration subsystem 202 identifies a preference to be configured for the user 118 (step 306). Recall that the term "user preferences" is used broadly herein to refer to any data associated with a particular user of a telephone system. One example of a preference that may be identified in step 306 is a preference indicating whether or not to forward the user's incoming calls to another telephone number. Another example of a preference that may be identified in step 306 is the telephone number to associate with a particular speed dial slot.

The process of identifying a preference to configure for the user 118 in step 306 may, for example, include identifying both the type of preference (step 306a) and one or more parameter values associated with the preference (step 306b). "Call forwarding" is an example of a type of preference, and the telephone number to which calls should be forwarded is an example of a parameter value for that type of preference. Similarly, in a system in which the user 118 may assign telephone numbers to ten different speed dial slots, the "speed dial" preference may have two parameters: (1) the speed dial slot number; and (2) the telephone number to store in that slot. Note that these are merely examples of preference types and preference parameter values, and do not constitute limitations of the present invention. Furthermore, the method 300 need not identify both a preference type and a preference value in step 306; it may only identify a preference type.

The method 300 assumes, for purposes of example, that the configuration subsystem 202 identifies a single preference to configure for the user U in step 306. In practice, however, the configuration subsystem 202 may not identify any preferences to configure for user U, or it may identify multiple preferences to configure for user U, depending on the content of the telephone system data received in step 304 and the particular criteria that are used to identify preferences to configure.

Assuming, however, that the configuration subsystem 202 identifies a single preference in step 306, the configuration subsystem 202 prompts the user 118 to confirm configuration of the identified preference (step 308). For example, in the case where the identified preference and parameter value are the "call forwarding" preference and a forwarding telephone number, respectively, the configuration subsystem 202 may perform step 308 by displaying a message (or transmitting an email or voicemail message) such as the following to the user 118: "You have forwarded calls to the telephone number 617-555-5555 ten times in the last two days. Do you want to automatically forward all calls to that telephone number?"

The user 118 provides input (such as by pressing a key on the telephone 104a) indicating whether he approves of the proposed configuration change. If the user 118 does not confirm the configuration change (step 310), no configuration changes are made and the method 300 repeats the preceding steps for the next user of the node 102 (step 314).

If, however, the user 118 confirms the configuration change (step 310), the configuration subsystem 202 performs the proposed configuration change by, for example, modifying 210 the user's preferences as stored in the database 116 (step 312). More specifically, the configuration subsystem 202 may store the parameter value(s) identified in step 306b in a field of the user's database record corresponding to the preference type identified in step 306a. For example, in the case where the identified preference type and parameter value are "call forwarding" and a corresponding telephone number, in step 314 the configuration subsystem 202 may modify the user's "call forwarding" field to indicate that call forwarding is enabled and store the corresponding telephone number in that field.

Having generally described one embodiment of the present invention, particular examples of preferences that may be configured will now be described. "Feature button mapping" is one example of such a preference. Modern PBX telephones typically include buttons (such as the buttons 120a and 120b on the telephones 104a-b shown in FIG. 1) that may be remapped to different features. Consider, for example, a telephone which includes ten "feature buttons," each of which may be mapped to any of a variety of features, such as call forwarding and speed dialing. The user 118 may, for example, choose to map (assign) button 1 to call forwarding, button 2 to a first speed dial telephone number, button 3 to a second speed dial telephone number, and so on.

In the absence of feature button mapping, accessing a particular feature typically involves pressing multiple keys on the telephone 104a. Feature button mapping is useful because it reduces the number of manual operations the user 118 must remember and perform, in some cases to as little as a single key press. For example, to access the "call forwarding" feature without the use of a "call forwarding" feature button, conventional systems typically require the user 118 to enter a multiple-key "feature code" corresponding to the "call forwarding" feature, followed by the forwarding telephone number itself. If, however, a feature button is mapped to the "call forwarding" feature but not to any specific forwarding telephone number, then the user 118 may activate call forwarding without the need to enter a feature code by pressing the mapped "call forwarding" feature button followed by the forwarding telephone number. If the feature button is mapped to the "call forwarding" feature and to a specific forwarding telephone number, the user 118 may activate call forwarding simply by pressing the "call forwarding" feature button.

Such conventional systems, despite the convenience they provide, still require the user 118 to manually map each feature button to the desired feature. In contrast, the system 200 illustrated in FIG. 2 may automatically perform such feature button mapping based, for example, on the frequency with which the user 118 uses the telephones 104a-b to access particular features. Such automatic configuration of feature buttons may be useful because some users use particular features more often than other features present in the system 200. For example, it is very common for a marketing executive to frequently come to the office where the telephones 104a-b are located for a short period of time and then to leave for the field. In such a situation, the marketing executive may activate the "call forwarding" feature each time he leaves for the field by manually entering the "call forwarding" feature code followed by the executive's cell phone number, so that he will continue to receive call s on his mobile telephone while out of the office. Such a person may activate the "call forwarding" feature in this way many times within the course of a week.

Similarly, it is common for the administrative assistant of a high-level manager to answer an incoming call for the manager and then transfer the call to the manager if the call is sufficiently important. The administrative assistant in this example may use the "call transfer" feature many times in the course of a day, requiring the manual entry of the "call transfer" feature code and the manager's telephone number.

These are merely examples of cases in which a particular user of the system 200 uses different features with different relative frequencies, and in which different users of the system 200 use the same features with different relative frequencies. If users of the system failed to manually configure their feature buttons, or if the feature buttons of particular users were not mapped optimally to reflect those users' usage patterns, the system's users would need to engage in time-wasting behavior to activate the features that are most useful to them.

Furthermore, even if a feature button is mapped to the "call forwarding" feature in the example just described, the "call forwarding" button may be in a suboptimal location. For example, if the user 118 uses the "call forwarding" feature more frequently than any other feature, it would be suboptimal for that caller's "call forwarding" feature button to be at the bottom of the set of feature buttons or hidden in the middle of the feature buttons. Configuring the first feature button to be the "call forwarding" button for that user would make the "call forwarding" button particularly easy for the user 118 to find and would therefore be advantageous.

The techniques described above with respect to FIGS. 2. and 3 may be used to perform such optimization of feature button mappings. For example, referring to FIG. 4, a flowchart is shown of a method 400 that is performed in one embodiment of the present invention by the configuration subsystem 202 to identify a particular feature that should be assigned to a feature button of the user 118. This is one example of identifying a preference to configure for the user 118 based on the telephone system data received by the configuration subsystem 202 (step 306 of method 300 in FIG. 3).

The following discussion assumes for purposes of example that the method 400 analyzes data related to a particular time period of interest, such as one month. Note that any time period may be chosen as the time period of interest, including all time periods for which data are stored in the database 116, logs 110, and/or CDRs 114. Selecting a finite time period including the recent past, however, enables the method 400 to perform configuration that more closely reflects recent usage patterns of the user 118.

The method 400 enters a loop over each feature F recognized by the system 200 (step 402). Note that the method 400 may ignore those features that user U has not used within the period of interest (e.g., one month). Ignoring unused features enables the method 400 to avoid the unnecessary consideration of features having zero frequency of use within the time period of interest.

As yet another example, the configuration subsystem 202 may be preconfigured to analyze a predetermined set of features identified in a list provided by the system administrator. The administrator may, for example, specify the list to contain those features that are desired to be configurable automatically by the configuration subsystem 202.

The method 400 identifies the user's frequency of use f of feature F during the time period of interest (step 404). For example, if feature F is call forwarding, then the frequency f with which the user 118 has used the call forwarding feature may be identified in step 404. Note that the frequency f may be measured in any units, such as occurrences per hour, day, week, or month.

Note further that the method 400 may measure usage of a particular feature in any of a variety of ways. For example, the method 400 may treat only the use of feature F in conjunction with a particular parameter value(s) (such as the use of the "speed dial" feature to speed dial a particular telephone number) to constitute a "use" of the feature for purposes of calculating the frequency f. Alternatively or additionally, the method 400 may treat any use of the "speed dialing" feature by the user U to constitute a "use" of the feature for purposes of calculating the frequency f. Furthermore, the method 400 may treat other actions by the user U, such as occurrences of the user U manually dialing the telephone number 617-555-5555 as an instance of the user's use of the "speed dial" feature for that telephone number. These and other techniques may be combined in various ways as desired to produce measurements of the frequency of use f of feature F.

The method 400 identifies a frequency threshold T for preference P (step 406). The frequency threshold T may be identified in any of a variety of ways. In one embodiment, for example, the frequency threshold T is an absolute value, such as a predetermined constant (e.g., 10 uses/day) associated with a particular feature.

Alternatively, for example, the frequency threshold T may be defined relative to the frequencies of use of features other than feature F. For example, the frequency threshold T may be identified by identifying the frequencies of use of all features for the user 118 and selecting the threshold T such that only a fixed number of features (such as a number equal to the number of feature buttons on the telephone 104a) exceed the feature threshold T. This is merely one example of a way in which the feature threshold T may be defined relative to the frequencies of use of features other than feature F.

The method 400 determines whether the identified frequency of use f of feature F is greater than the identified frequency threshold T (step 408). For example, if feature F is the call forwarding feature and T is 10 uses/day, the method 400 determines in step 408 whether the user 118 has used the call forwarding feature more than 10 times per day on average.

If the frequency of use f is not greater than the frequency threshold T, the method 400 proceeds to the next feature F (step 416). If, however, the frequency of use f is greater than the frequency threshold T, the method 400 configures feature F for user U (step 410). The method 400 may, for example, perform step 410 by identifying a feature button B on the telephone 104a (step 412) and mapping feature button B to feature F for user U by modifying the user's preference data in the database 116 appropriately (step 414). The method 400 may identify the feature button B in any way, such as by identifying a feature button that is not currently mapped to any feature, or by identifying a feature button having a frequency of use that is less than the frequency of use f identified in step 404.

In the present example, the configuration subsystem 202 might map the identified feature button B to the call forwarding function. Once such a mapping has been performed, the user U may enable calls to be forwarded to a desired forwarding telephone number by pressing the mapped feature button B followed by the desired forwarding telephone number.

Recall, however, that the feature F might be a combination of a feature (e.g., call forwarding) and a particular parameter value (e.g., a particular telephone number to which calls have been forwarded). In this case, step 414 may involve mapping the identified feature button to the call forwarding function for forwarding calls to a predetermined telephone number. Once such a mapping has been performed, the user U may enable calls to be forwarded to that telephone number simply by pressing the mapped feature button B.

Figure 4:
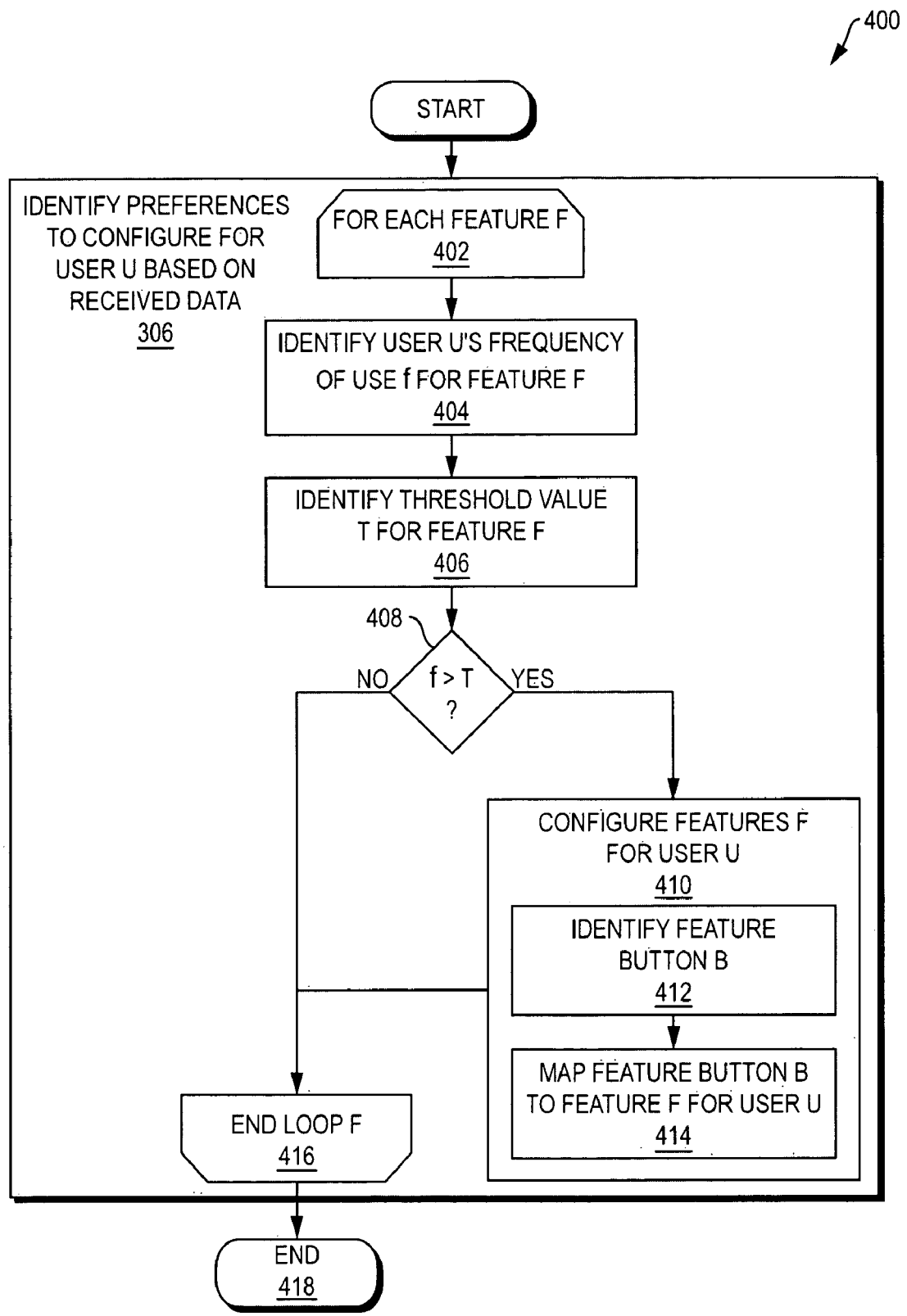
FIG. 4 is a flowchart of a method for identifying a feature to assign to a telephone feature button according to one embodiment of the present invention.

The self-configuration process 400 illustrated in FIG. 4, therefore, saves time for the user 118 by reducing the extent to which the user 118 needs to identify his own usage patterns and to interact with the telephone 104a to perform desired functions.

Some telephones may allow any feature button to be mapped to any feature, while other telephones may have certain buttons dedicated solely for use as "speed dial" buttons. The method 400 generally illustrated in FIG. 4 may be applied to either kind of telephone, although it may need to be performed separately for speed dial buttons and feature buttons in systems having such separate sets of buttons. Furthermore, as implied by the discussion above, the method 400 may assign a speed dial button (or generic feature button) to a particular telephone number not only in response to observing the user 118 use a speed dial button to dial that telephone number with a sufficiently high frequency, but also in response to observing the user 118 manually dial that telephone number with a sufficiently high frequency, or to any combination thereof. As further implied by the discussion above, the method 400 may count any use of the telephone 104a by the user 118 to dial a specific telephone number-whether manually, using a speed dial button, or using any other means-for purposes of calculating the frequency of use f of use of that telephone number. The same is true more generally for calculating the frequency of use f of any feature.

The method 400 illustrated in FIG. 4 may be applied to other features. For example, upon observing that the user 118 has dialed a particular telephone number with a sufficiently high frequency, the method 400 may be used to add that telephone number to the user's phone book (stored in the database 116). This is merely another example of a feature that may be configured by the method 400, and does not constitute a limitation of the present invention.

In another embodiment of the present invention, the configuration subsystem 202 reprioritizes the features assigned to the feature buttons 120a on the telephone 104a based on the relative frequencies of use of such features. For example, the features may be organized so that they are listed in decreasing order of frequency, with the most-frequently used features on the top and the least-frequently used features on the bottom. Other orderings, however, may be used to make the more-frequently used features more easily accessible than less-frequently used features, depending on factors such as the physical arrangement of the feature buttons.

Figure 5:
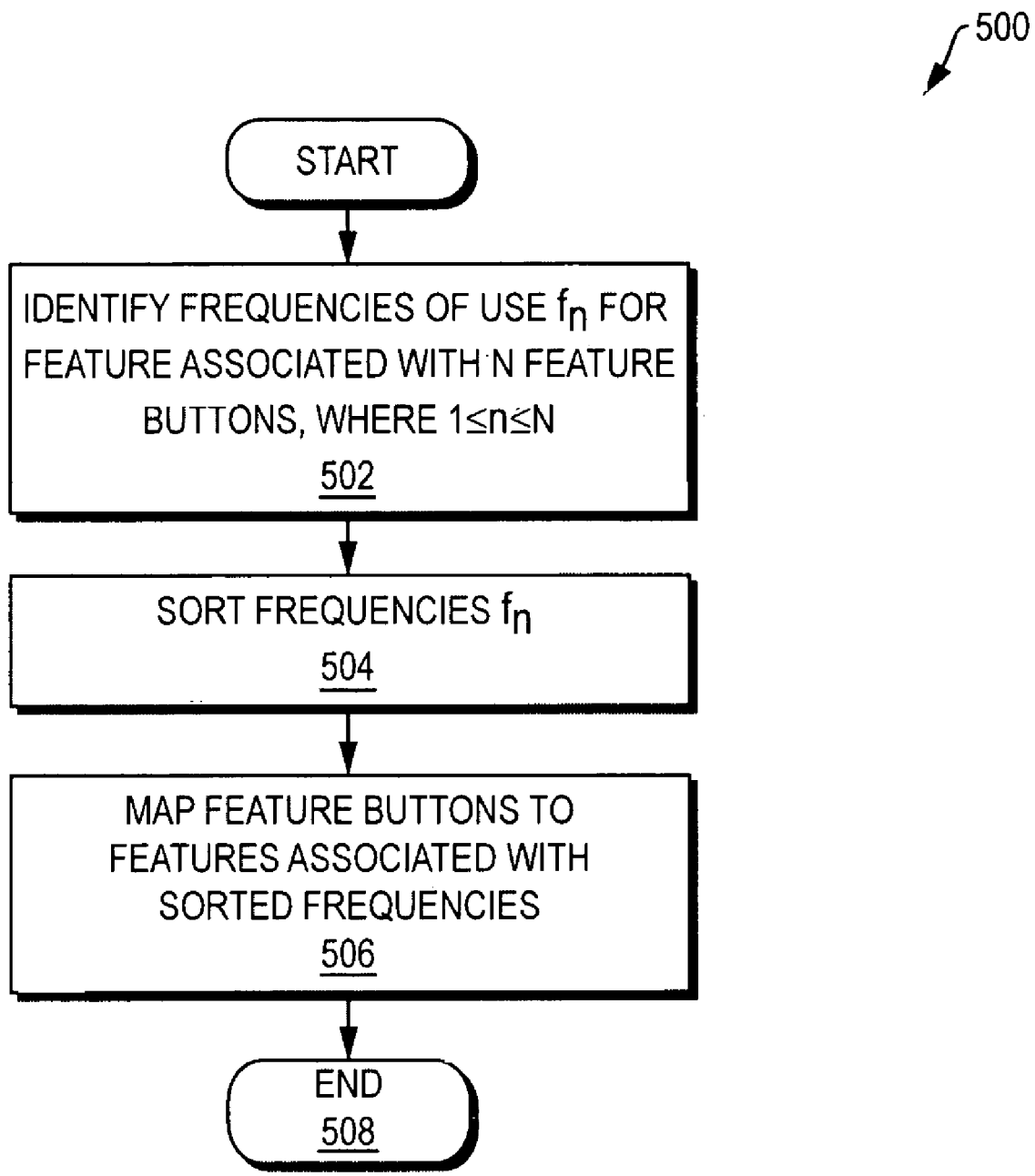
FIG. 5 is a flowchart of a method for reordering features assigned to telephone feature buttons according to one embodiment of the present invention.

Referring to FIG. 5, a flowchart is shown of a method 500 for performing this function according to one embodiment of the present invention. The method 500 identifies the frequencies of use $f_n$ for the features associated with the N feature buttons 120a on the telephone 104a, where $1 \leq n \leq N$ (step 502). The method 500 sorts the identified frequencies $f_n$ (step 504). The method 500 maps the feature buttons to the features associated with the sorted frequencies $f_n$ and in the order of the sorted frequencies $f_n$ (step 506). As a result, the feature buttons are mapped to features in order of the their relative frequencies of use.

The method 500 shown in FIG. 5 is merely one example of a way in which feature buttons may be mapped to features to reflect their relative frequency of use. As one alternative, for example, the features associated with a particular pair of feature buttons may be swapped only if their associated frequencies of use differ by greater than a predetermined threshold. Furthermore, the method 500 may be scheduled to be performed relatively infrequently, such as once a month, to limit the extent to which remapping of feature buttons disrupts the user's ability to remember feature button mappings. All of these techniques are merely examples of ways in which the configuration subsystem 202 may remap feature buttons to reflect the relative frequencies of use of the corresponding features and do not constitute limitations of the present invention.

The logs 110, CDRs 114, and database 116 are examples of telephone system data from which the configuration subsystem 202 may draw to identify preferences to configure. These particular examples, however, do not constitute limitations of the present invention. More generally, the configuration subsystem 202 may draw on any telephone system data available within the system 200 (including data available within nodes other than node 102) to identify patterns (such as usage trends, performance trends, and business trends), cues indicating information that is not currently stored in the system 200, and statistics descriptive of the patterns and cues.

The self-configuration processes described above with respect to FIGS. 3-5 include two high-level steps: learning and adapting. Learning involves, for example, identifying a usage pattern of the user 118. Adapting involves, for example, modifying the user's preferences in the database 116 in response to what was learned so that the behavior of the system 200 changes accordingly.

For the configuration subsystem 202 to perform these functions, it needs to interface with other components of the system 200. The configuration subsystem 202 needs two kinds of interfaces: input interfaces (which read data from other components of the system 200) and output interfaces (which provide data to other components in the system). The input interfaces read, for example, data from the logs 110, CDRs 114, and database 116. The output interfaces, for example, store user preferences in the database 116.

In one embodiment, each of the CDRs contains the following fields: (1) VERSIONID, for storing data indicating the version of the CDR; (2) ACCOUNTID, for storing a unique account identifier of the user 118 who placed the call; (3) CALLINGPARTYIPADDRESS, for storing the IP address of the party who placed the call; (4) CALLEDPARTYIPADDRESS, for storing the IP address of the party to whom the call was placed; (5) FEATURESUSED, indicating which features were used during the call; and (6) CALLEEFORWARDNUMBER, for storing the telephone number, if any, to which the telephone call was forwarded.

As can be seen from this example, a CDR for a call contains rich information about the call that can be used by the configuration subsystem 202 to identify patterns of the user's usage behavior. Note, however, that these particular CDR fields are merely examples and do not constitute limitations of the present invention. More generally, information about individual calls may be stored in records other than and/or in addition to CDRs. Those having ordinary skill in the art will understand how to use the configuration subsystem 202 to read data in the CDRs 114 and to parse such data to derive the information described herein.

The configuration subsystem 202 may read data (such as the data stored in the logs 110, CDRs 114, and/or database 116) in real-time, i.e., while each call is placed. Alternatively, the configuration subsystem 202 may read such data periodically, such as once a day during a batch process in which the configuration subsystem 202 reads data corresponding to multiple calls. The frequency at which data are read may be configured as desired to achieve an appropriate tradeoff between resource usage and timeliness of configuration data.

As mentioned above with respect to step 308 of the method 300 shown in FIG. 3, once the configuration subsystem 202 has read the relevant data, the configuration subsystem 202 may prompt the user 118 for authorization to configure the identified preference for the user 118. The prompt may be provided in any way, such as by displaying a message on a display of the telephone 104a, or by sending a voicemail message to the user 118. The configuration subsystem 202 may communicate 212 with a Unified Messaging Suite 108, which provides the ability to interface with external applications and to transmit messages to the user 118. Those having ordinary skill in the art will appreciate how to use the UMS 108 to perform these functions. Similarly, the user database 116 provides interfaces that can be used by those having ordinary skill in the art to modify data stored in the database 116.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Note that although the term "feature buttons" is used in conjunction with various embodiments disclosed herein, the term "feature buttons" may refer not only to physical buttons on the telephone 104a but rather to any set of means for receiving input from the user 118. For example, the physical feature buttons 120a may alternatively be implemented using switches, knobs, "soft" buttons (virtual buttons displayed on a display screen), or any other textual or graphical user interface elements (such as textual commands or pull-down menu items).

Although certain embodiments may be described herein as being used in conjunction with PBXs or other particular kinds of telephone systems, embodiments of the present invention are not limited to any particular kind of telephone system. For example, techniques disclosed herein may be used in conjunction with any variant of PBX systems (such as Voice Over IP (VoIP) PBX, also known as IPBX, or a hosted PBX), key systems, Plain Old Telephone Systems (POTS), DECT (Digital Enhanced Cordless Telecommunications), or IP (such as H.323 or Session Initiation Protocol (SIP)). These systems may be combined in various ways, such as by using analog telephone adapters (ATAs) to connect standard analog (POTS) telephones to VoIP networks.

Furthermore, although certain examples described herein involve telephones, embodiments of the present invention may be applied to other devices for use with telephone systems, such as fax machines, modems, multifunction printers, photocopiers, and combinations thereof.

Although examples of particular telephone features are provided herein, embodiments of the present invention are not limited to use in conjunction with those particular features. Examples of features to which embodiments of the present invention may be applied include, but are not limited to, call transfer, direct inward dialing, speed dialing (also known as customized abbreviated dialing), voice mail, follow me, call forwarding on absence, call forwarding on busy, music on hold, automatic ring back, night service, call distribution, call waiting, call pick-up, call park, call conferencing, and custom greetings.

As described above, the term "user preferences" refers herein to any data associated with a particular user of a telephone system. Such data include, but are not limited to, user-specific data stored in the logs 110, CDRs 114, and database 116. Note that a user preference need not be expressly specified by the user; rather, the user may have implied preferences. The methods described above with respect to FIGS. 3-5 are examples of techniques for identifying and storing implied user preferences.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
   (A) receiving telephone system data descriptive of past actions performed using a telephone system by a user of the telephone system;
   (B) identifying a preference of the user based on the received telephone system data, comprising:
      (B)(1) identifying a feature of the telephone system;
      (B)(2) identifying a frequency of use of the feature by the user;
      (B)(3) determining, based on the frequency of use, whether to configure the preference for the user; and
   (C) configuring the identified preference, based on the received telephone system data, only if it is determined that the preference should be configured for the user.

2. The method of claim 1, wherein the telephone system data comprises at least one kind of data selected from the group consisting of log data, call detail record data, and user database data.

3. The method of claim 1, wherein (B) further comprises:
   (B)(4) identifying a preference type based on the received telephone system data;
   (B)(5) identifying the preference based on the identified preference type; and
   (B)(6) identifying a value for a parameter of the preference;
   and wherein configuring the preference comprises storing the value in the parameter of the preference.

4. The method of claim 1, further comprising:
   (D) prompting the user to confirm configuration of the identified preference;
   and wherein (C) comprises configuring the identified preference only if the user confirms configuration of the identified preference and it is determined that the preference should be configured for the user.

5. The method of claim 1, wherein configuring the identified preference comprises:
   (1) identifying an input selection means associated with a telecommunications device of the user in the telephone system; and
   (2) mapping the identified input selection means solely to the feature for the user.

6. The method of claim 5, wherein the telecommunications device comprises a telephone and wherein the input selection means comprises a feature button on the telephone.

7. The method of claim 1, wherein (B) (3) comprises:
   (B)(3)(a) identifying a threshold value for the feature; and
   (B)(3)(b) determining that the feature should be configured for the user if the frequency of use exceeds the threshold value.

8. The method of claim 7, wherein (B)(3)(a) comprises identifying a threshold value that is a constant value associated with the feature.

9. The method of claim 8, wherein (B)(3)(a) comprises identifying a threshold value that is relative to at least one frequency of use of at least one other feature of the telephone system.

10. A telephone system comprising:
   a store of telephone system data descriptive of past actions performed using a telephone system by a plurality of users of the telephone system;
   preference identification means for identifying a preference of one of the plurality of users based on the telephone system data, comprising:
      feature identification means for identifying a feature of the telephone system;
      frequency identification means for identifying a frequency of use of the feature by the user;
      determination means for determining, based on the frequency of use, whether to configure the preference for the user; and
   configuration means for configuring the identified preference, based on the received telephone system data, only if it is determine that the preference should be configured for the user.

11. The telephone system of claim 10, wherein the telephone system data comprises at least one kind of data selected from the group consisting of log data, call detail record data, and user database data.

12. The telephone system of claim 10, wherein the preference identification means comprises:
   means for identifying a preference type based on the received telephone system data;
   means for identifying the preference based on the identified preference type; and
   means for identifying a value for a parameter of the preference;
   and wherein the configuration means comprises means for storing the value in the parameter of the preference in the user database data.

13. The telephone system of claim 10, further comprising:
   unified messaging means for prompting the user to confirm configuration of the identified preference, and
   wherein the configuration means comprises means for configuring the identified preference only if the user confirms configuration of the identified preference and it is determined that the preference should be configured for the user.

14. A computer-implemented method comprising:
   (A) identifying a plurality of frequencies of use of a plurality of features of a telephone system by a user of the telephone system, the plurality of features having a current mapping to a plurality of input selection means of a telecommunications device of the user of the telephone system;
   (B) identifying, based on the plurality of frequencies of use, a new mapping of the plurality of features to the plurality of input selection means; and
   (C) remapping the plurality of features to the plurality of input selection means using the new mapping, wherein the new mapping maps each of the plurality of input selection means to a single corresponding one of the plurality of features.

15. The method of claim 14, wherein the telecommunications device comprises a telephone and wherein the plurality of input selection means comprise a plurality of feature buttons on the telephone.

16. The method of claim 14, wherein (B) comprises:
   (B)(1) sorting the plurality of frequencies of use to produce a sorted plurality of frequencies of use; and
   (B) (2) identifying the new mapping based on the sorted plurality of frequencies of use.

17. A telephone system comprising:
   a telecommunications device of a user of the telephone system, the telecommunications device comprising a plurality of input selection means;
   means for identifying a plurality of frequencies of use of a plurality of features of a telephone system by a user of the telephone system, the plurality of features having a current mapping to the plurality of input selection means of the telecommunications device;
   means for identifying, based on the plurality of frequencies of use, a new mapping of the plurality of features to the plurality of input selection means; and means for remapping the plurality of features to the plurality of input selection means using the new mapping, wherein the new mapping maps each of the plurality of input selection means to a single corresponding one of the plurality of features.

18. The telephone system of claim 17, wherein the telecommunications device comprises a telephone and wherein the plurality of input selection means comprise a plurality of feature buttons on the telephone.

19. The telephone system of claim 17, wherein the means for identifying the new mapping comprises:

means for sorting the plurality of frequencies of use to produce a sorted plurality of frequencies of use; and means for identifying the new mapping based on the sorted plurality of frequencies of use.

20. The method of claim 1, wherein the feature comprises a telephone dialing feature, wherein the frequency of use of the feature by the user comprises a frequency of dialing of a particular telephone number by the user, and wherein configuring the identified preference comprises assigning the particular telephone number to a speed dial slot associated with the user.

21. The method of claim 1, wherein the feature comprises a telephone call forwarding feature, wherein the frequency of use of the feature by the user comprises a frequency of forwarding of telephone calls to a particular telephone number by the user, and wherein configuring the identified preference comprises associating the call forwarding feature with the particular telephone number.

* * * * *